Figure 1:
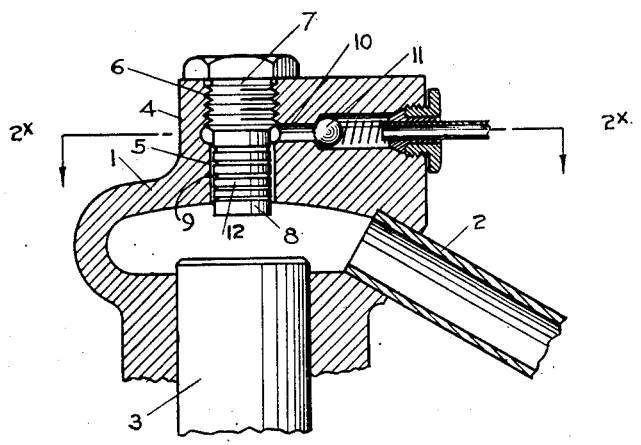

Oct. 30, 1928.

W. NOBLE 1,690,033

AIR BLEED VALVE FOR HYDRAULIC ACTUATING MEANS

Filed April 25, 1927

Inventor
Warren Noble

By

Attorney

Patented Oct. 30, 1928.

1,690,033

UNITED STATES PATENT OFFICE.

WARREN NOBLE, OF DETROIT, MICHIGAN.

AIR-BLEED VALVE FOR HYDRAULIC ACTUATING MEANS.

Application filed April 25, 1927. Serial No. 186,556.

This invention relates to the hydraulic actuating means wherein an enclosed column of oil, or other suitable incompressible fluid, is utilized for the transmission of motion from one member to another, as, for instance, the operation by an oil column of a puppet valve from a remotely actuated tappet as described in my co-pending application, Serial Number 180,119 filed the 1st day of April 1927, and has for its object to provide facility for the bleeding of air from the casing enclosing the oil column in order to maintain an efficiently operable incompressible connection between the actuating and the actuated members.

The present invention contemplates, and has for its object to provide, an air bleed passage situated at a high point in the oil column casing, or at such point therein where air is apt to accumulate, said passage being so restricted in the separation of its walls as to permit free passage of air therethrough, but to prevent passage of the denser fluid therethrough; such passage being also extended to provide a proportionally large outlet opening from the casing relative to the width of the said opening, whereby, despite its restricted nature, it is not readily liable to be completely closed by dirt or foreign matter in the oil column. It is further proposed to provide a check valve operating to prevent return flow through said opening to the oil column casing.

A still further object is to provide air bleed means in an oil column casing, said means being in the form of a large opening situated at the high point or air trap in the said casing, and a plug extending into said opening, said plug being of slightly smaller diameter than said opening so that restricted clearance around said plug is afforded by the wall of said opening, and a check valve permitting flow from the said casing through said clearance for the discharge of air from said casing and the prevention of flow through said clearance in the opposite direction.

A still further object of the invention is to provide means, in one or other of the walls of said clearance opening, interrupting and adapting to build up resistance against the outward flow of oil, or similar dense fluid, therethrough.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide a hydraulic actuator head, as the upper end of an oil column casing, with a boss bored to receive a plug of substantial diameter having slight clearance from the bore of the boss, resulting in a circular opening having restricting walls but of relatively considerable diameter, said boss being provided with a discharge passage from said restricted opening and a check valve closing said passage except to discharge flow.

All of which is more particularlly described and ascertained hereinafter, by way of example, having reference to the accompanying drawing, wherein:—

Figure 2:
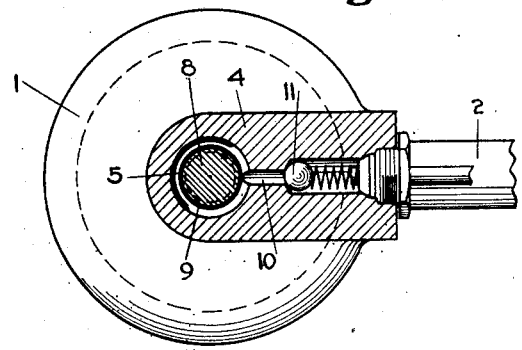

Figure 1 is a fragmentary sectional elevation of a valve actuator head, embodying the said invention; and Figure 2 is a plan of the same.

Similar characters of reference indicate similar parts in both figures of the drawings.

The valve actuator head 1 forms the upper end of an oil column casing, including the oil pipe 2, wherein the column of oil is enclosed to transmit impulses for the actuation of the valve stem 3 presented to the interior of the said actuator head.

Where the actuator head is so located that it forms the high point of an oil column casing, such as in the example, it also forms an air trap for entrained or otherwise accumulated air in the oil column, and it is very desirable, and in some cases imperative, that such trapped air be eliminated from the oil column casing. For this purpose, the actuator head 1 is shown as having an enlargement or boss 4 thereon, which is bored at 5 to provide an opening of comparatively large diameter in the top of the actuator head. The said boss is tapped at 6 to receive a plug 7 the end portion or stem 8 of which enters the said opening 5 of the actuator head and is of slightly smaller diameter than the said opening, thus providing a slight circular clearance 9 around the inner end 8 of the plug. For instance, the bore 5 may be .125 inch in diameter, and the stem 8 of the plug entering the opening .123 inch in diameter, leaving a clearance around the plug of one thousandth of an inch. This small clearance will readily permit the escape of air therethrough, but is not sufficient to permit the discharge of oil of sufficient body therethrough, at least at any velocity that would seriously affect the operation of the device. The actual restriction for any particular purpose is, of course, governed by the requirements, the nature of the hydraulic fluid used and the pressures to be contended with.

The boss 4 of the actuator head is also provided with a discharge passage 10 leading from the upper end of the restricted opening 9 and closed by a check valve 11 which permits discharge only and prevents return of air therethrough to the actuator head.

The stem 8 of the plug 7 is shown as being provided with a succession of annular grooves 12 which serve to interrupt the passage of oil tending to escape with the air through the restricted opening 9, and any oil in these grooves of an appreciable accumulation may drain back into the actuator head upon the cessation of air flow through the said restricted opening.

It will be obvious that, although free outlet for air from the actuator head is provided by the means described, the extended nature of the opening around the stem of the plug 8 minimizes the possibility of such opening being fouled, to an extent totally preventing discharge of air, by small amounts of dirt or foreign matter which may get into the oil column.

This invention may be developed within the scope of the following claims without departing from the essential features of the said invention, and it is desired that the specification and drawing be read as being merely illustrative and not in a limiting sense, except as necessitated by the prior art.

What I claim is:—

1. Means for bleeding air from the fluid casing of a hydraulic system, comprising a walled air passage opening from a region of air accumulation in said casing, said passage being restricted transversely in one direction to an extent resisting passage of hydraulic fluid therethrough and extended in another direction to provide substantial area in said passage, and a non-return outlet valve through which said passage discharges.

2. Means for bleeding air from the fluid casing of a hydraulic system, comprising a substantially large walled opening extending from a region of air accumulation in said casing, a plug of slightly less diameter entered in said opening whereby an annular restricted passage is provided around said plug, and a non-return outlet valve for said passage.

3. Means for bleeding air from the fluid casing of a hydraulic system, comprising a walled annular passage the walls whereof are restricted beyond an extent permitting free passage of hydraulic fluid therebetween, said passage opening from a region of air accumulation in said casing, and a non-return outlet valve for said passage.

4. In hydraulic valve actuating means, the combination with a puppet valve stem of an actuator head in the form of a chambered casing to the interior of which said valve stem is exposed for operation by a hydraulic fluid in said head, a walled air outlet passage opening from said actuating head, said passage being restricted in one direction sufficient to substantially prevent passage of hydraulic fluid therethrough and extended in another direction to give relatively large area thereto, and a non-return outlet valve for said passage.

In testimony whereof I affix my signature.

WARREN NOBLE.